(12) United States Patent
    Gubenko et al.

(10) Patent No.: US 10,821,645 B2
(45) Date of Patent: Nov. 3, 2020

(54) DEVICE FOR DEFORMATIONAL PROCESSING OF MATERIALS (VARIANTS)

(71) Applicant: Obshchestvo s ogranichennoy otvetstvennostyu "Avtoklavy vysokogo davleniya i temperatury", Moscow (RU)

(72) Inventors: Lev Anatolyevich Gubenko, Moscow (RU); Vladimir Evseevich Perelman, Moscow (RU)

(73) Assignee: Obshchestvo s ogranichennoy otvetstvennostyu "Avtoklavy vysokogo davleniya i temperatury", Moscow (RU)

( * ) Notice: Subject to any disclaimer, the term of this patent is extended or adjusted under 35 U.S.C. 154(b) by 659 days.

(21) Appl. No.: 15/539,921

(22) PCT Filed: Dec. 30, 2014

(86) PCT No.: PCT/RU2014/001012
    § 371 (c)(1),
    (2) Date: Jun. 26, 2017

(87) PCT Pub. No.: WO2016/108716
    PCT Pub. Date: Jul. 7, 2016

(65) Prior Publication Data
    US 2017/0348890 A1    Dec. 7, 2017

(51) Int. Cl.
    *B29C 48/685*    (2019.01)
    *B29C 48/395*    (2019.01)
    (Continued)

(52) U.S. Cl.
    CPC ............ *B29C 48/687* (2019.02); *B29B 7/422* (2013.01); *B29C 48/397* (2019.02);
    (Continued)

(58) Field of Classification Search
    CPC ... B29C 48/687; B29C 48/681; B29C 48/685; B29C 48/397; B29C 48/565; B29B 7/422; B29B 7/802; B29B 48/52
    See application file for complete search history.

(56) References Cited

U.S. PATENT DOCUMENTS

| | | | |
|---|---|---|---|
| 3,873,072 A | 3/1975 | Blackmon | |
| 4,129,386 A | 12/1978 | Rauwendaal | |
| 4,640,672 A * | 2/1987 | Ellwood | B29C 48/395 |
| | | | 425/192 R |
| 5,297,948 A * | 3/1994 | Sadr | B29C 44/3446 |
| | | | 425/208 |

(Continued)

FOREIGN PATENT DOCUMENTS

| | | |
|---|---|---|
| CN | 201579893 U | 9/2010 |
| CN | 102189666 A | 9/2011 |

(Continued)

OTHER PUBLICATIONS

International Search Report of PCT/RU2014/001012, dated Sep. 10, 2015.

*Primary Examiner* — Jacob T Minskey
*Assistant Examiner* — Virak Nguon
(74) *Attorney, Agent, or Firm* — Collard & Roe, P.C.

(57) ABSTRACT

The devices relate to the nuclear, metallurgical, mining, machine-building and food industries and may be used in producing semi-finished products and items made via the extrusion of powders of composite, polymer and other plastic masses. A device for producing semi-finished products or items made of composite, or polymer, or plasticized powder materials includes a screw press with a housing and a screw within the housing. The housing and the screw each have at least one deformational portion with protrusions and may each be formed integrally with the protrusions or may be formed compositionally, having special insertable rings which are provided with protrusions. In carrying out all three device variants, the housing and the screw are formed compositionally, and have provided, on the deformational portions of a ring, stators, which are secured to neighboring (Continued)

Figure 1:
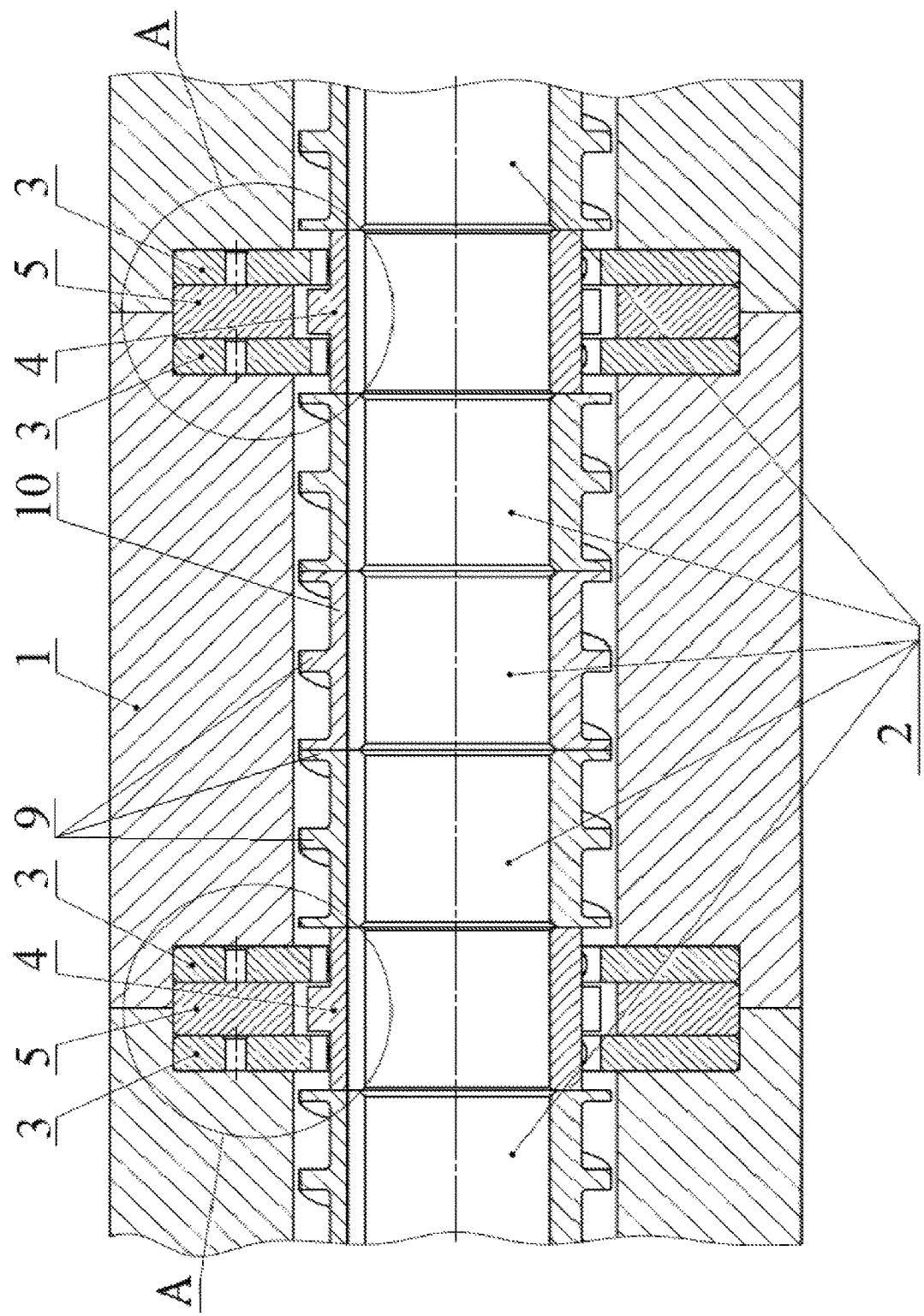

portions of the housing, and rotors, which are secured to neighboring portions of the screw.

17 Claims, 17 Drawing Sheets

(51) Int. Cl.
*B29C 48/68* (2019.01)
*B29B 7/42* (2006.01)
*B30B 11/24* (2006.01)
*B29C 48/565* (2019.01)
*B29B 7/80* (2006.01)
*B29C 48/25* (2019.01)

(52) U.S. Cl.
CPC .......... *B29C 48/565* (2019.02); *B29C 48/681* (2019.02); *B30B 11/248* (2013.01); *B29B 7/802* (2013.01); *B29C 48/2565* (2019.02); *B29C 48/6801* (2019.02)

(56) References Cited

U.S. PATENT DOCUMENTS

| | | | |
|---|---|---|---|
| 5,419,634 | A | 5/1995 | Bacher et al. |
| 6,709,147 | B1* | 3/2004 | Rauwendaal ........... B29B 7/421 366/80 |
| 9,011,131 | B2 | 4/2015 | Mazzocca |
| 2009/0027994 | A1* | 1/2009 | Grutter ................... B29B 7/423 366/79 |

FOREIGN PATENT DOCUMENTS

| | | |
|---|---|---|
| CN | 103978660 A | 8/2014 |
| DE | 26 50 248 A1 | 5/1978 |
| JP | S51-86576 A | 7/1976 |
| JP | S53-37764 U | 4/1978 |
| RU | 2092318 C1 | 10/1997 |
| SU | 1362648 A1 | 12/1987 |
| WO | 99/56937 A1 | 11/1999 |
| WO | 2012/156263 A1 | 11/2012 |

* cited by examiner

DEVICE FOR DEFORMATIONAL PROCESSING OF MATERIALS (VARIANTS)

CROSS REFERENCE TO RELATED APPLICATIONS

This application is the National Stage of PCT/RU2014/001012 filed on Dec. 30, 2014, the disclosure of which is incorporated by reference. The international application under PCT article 21(2) was not published in English.

FIELD OF THE INVENTION

The group of inventions relates to the nuclear, metallurgical, mining, machine-building and food industries and may be used in the production of half-finished articles and products via the extrusion of powders of composite, polymer and other plastic materials with the use of a screw extruder.

BACKGROUND OF THE INVENTION

It is known a screw extruder for processing polydispersional materials, comprising a housing, a bushing the inner surface of which comprises undulating spiral protrusions having a periodically changing cross-section of troughs of arbitrary shape, a screw and a multi-channel extrusion tool. The undulating troughs of the protrusions are shifted with respect to each other so that the cross-section area of all the protrusions is the same in any arbitrary section of the housing (RU 2092318 C1, published on the Oct. 10, 1997). The moldable pulp is maintained against turning over together with the screw by means of the protrusions provided on the bushing inserted into the housing of the screw extruder.

However, the known extruder does not provide for a high degree of deformational processing of the material and the structure homogeneity of the same.

SUMMARY OF THE INVENTION

The purpose of the present invention is to improve the quality of the manufactured half-finished articles and products.

The technical result providing for the solution of the purpose foreseen is to enable a high degree of deformational processing of the material and to obtain half-finished articles and products having a homogenous structure.

Said technical result is achieved with a device for deformational processing of materials according to the first variant that comprises a screw extruder having a housing with a cylindrical inner surface and a screw each one of the last presenting at least one deformation portion located between the screw turns, the extruder housing having, on the inner surface of at least one deformation portion, several protrusions located in a row on a circumference and with a space between the same and the outer cylindrical surface of the screw between the turns of the last, the screw having, on the outer surface of at least one deformation portion, several protrusions arranged in a row on a circumference and with a space between them and the inner surface of the housing, sizes of said protrusions in the axial direction and their arrangement being selected so that when the protrusions of the housing and the protrusions of the screw are facing each other, they form couples of protrusions having, between the facing surfaces, a distance equal to a minimum allowable clearance $L_1$ for some couples of protrusions, the other couples of protrusions having a distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction.

Said technical result is achieved as well thanks to the fact that a device for deformational processing of materials according to the second variant comprises a screw extruder having a housing with a cylindrical inner surface and a screw each one of both of them presenting at least one deformation portion located between the screw turns, the extruder housing having, on the inner surface of at least one deformation portion, several protrusions arranged in two rows on a circumference and with a space between them and the outer cylindrical surface of the screw between the turns of the last, the screw having, on the outer surface of at least one deformation portion, several protrusions arranged in a row on a circumference between the rows of the housing protrusions and with a space between the screw protrusions and the inner surface of the housing, sizes of said protrusions in the axial direction and their arrangement being selected so that when the protrusions of the housing and the protrusions of the screw are facing each other, they form couples of protrusions having, between the facing surfaces, a distance equal to a minimum allowable clearance $L_1$ for some couples of protrusions, the other couples of protrusions having the distance $L_2$ that is not less than the half-height of a screw turn.

A variant is possible when the couples of protrusions or groups of couples of protrusions with the distance $L_1$ and the couples of protrusions or groups of couples of protrusions with the distance $L_2$ alternate in the circumferential direction.

Furthermore, particular cases for the arrangement of protrusions of the housing and the screw are possible.

In the first case, sizes of the protrusions in the axial direction and their arrangement are selected so that when the housing protrusions of both rows and the screw protrusions are facing each other, they form couples of protrusions having, between said facing surfaces, a distance equal to a minimum allowable clearance $L_1$ for some couples of protrusions, the other couples of protrusions having the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction.

In the second case, sizes of the protrusions n the axial direction and their arrangement are selected so that when the housing protrusions of one row and the screw protrusions are facing each other, they form couples of protrusions having, between said facing surfaces, a distance equal to a minimum allowable clearance $L_1$ for some couples of protrusions, the other couples of protrusions having the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction, and when the housing protrusions of the second row of the housing and the screw protrusions are facing each other, they form couples of protrusions having, between said facing surfaces, a distance equal to the minimum allowable clearance $L_1$ for all the couples of protrusions.

According to another variant, the couples of housing protrusions of one row and of screw protrusions have the distance $L_1$, while the couples of housing protrusions of the second row and the screw protrusions have the distance $L_2$.

Said technical result is achieved as well by the fact that a device for deformational processing of materials according to the third variant comprises a screw extruder having a housing with a cylindrical inner surface and a screw each one of both of them presenting at least one deformational portion located between the screw turns, the screw having, on the outer surface of at least one deformation portion, several protrusions arranged in two rows on a circumference and with a space between the screw protrusions and the inner surface of the housing, the extruder housing having, on the outer surface of at least one deformation portion, several protrusions arranged in a row on a circumference between the rows of screw protrusions and with a space between the housing protrusions and the outer cylindrical surface of the screw between the turns of the same, sizes of said protrusions in the axial direction and their arrangement being selected so that when the protrusions of the housing and the protrusions of the screw of at least one row are facing each other, they form couples of protrusions having, between said facing surfaces, a distance equal to a minimum allowable clearance $L_1$ for some couples of protrusions, the other couples of protrusions having the distance $L_2$ that is not less than the half-height of a screw turn.

Another variant is possible when the couples of protrusions or groups of couples of protrusions with the distance $L_1$ and the couples of protrusions or groups of couples of protrusions with the distance $L_2$ alternate in the circumferential direction.

Furthermore, two particular cases of arrangement for the housing and screw protrusions are possible as well.

In the first case, sizes of protrusions in the axial direction and their arrangement are selected so that when the housing protrusions and the screw protrusions of both rows are facing each other, they form couples of protrusions having, between said facing surfaces, a distance equal to a minimum allowable clearance $L_1$ for some couples of protrusions, the other couples of protrusions having the distance $L_2$ that is not less than the half-height of a screw turn, the couples of protrusions or groups of couples of protrusions with the distance $L_1$ and the couples of protrusions or groups of couples of protrusions with the distance $L_2$ alternating in the circumferential direction.

In the second case, sizes of protrusions in the axial direction and their arrangement are selected so that when the housing protrusions and the screw protrusions of one row are facing each other, they form couples of protrusions having, between said facing surfaces, a distance equal to a minimum allowable clearance $L_1$ for some couples of protrusions, the other couples of protrusions having this distance equal to $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction, and when the housing protrusions and the screw protrusions of the second row are facing each other, they form couples of protrusions having, between said facing surfaces, a distance equal to the minimum allowable clearance $L_1$ for all the couples of protrusions.

Another variant is possible when the couples of protrusions of the screw in one row and the couples of protrusions of the housing have the distance $L_1$ and the couples of protrusions of the screw in another row and the couples of protrusions of the housing have the distance $L_2$.

According to the three variants of the device, in particular cases, the screw can be made combined in such a way that a part of the same on each deformation portion is made as at least one ring rigidly linked to the adjacent part of the screw, and the housing can be made combined in such a way that a part of the same on each deformation portion is made as at least one ring rigidly linked to the adjacent part of the housing.

LIST OF FIGURES

The group of inventions is illustrated by the drawings.

FIG. 1 shows an axial section of the proposed device according to the second variant.

Figure 2:
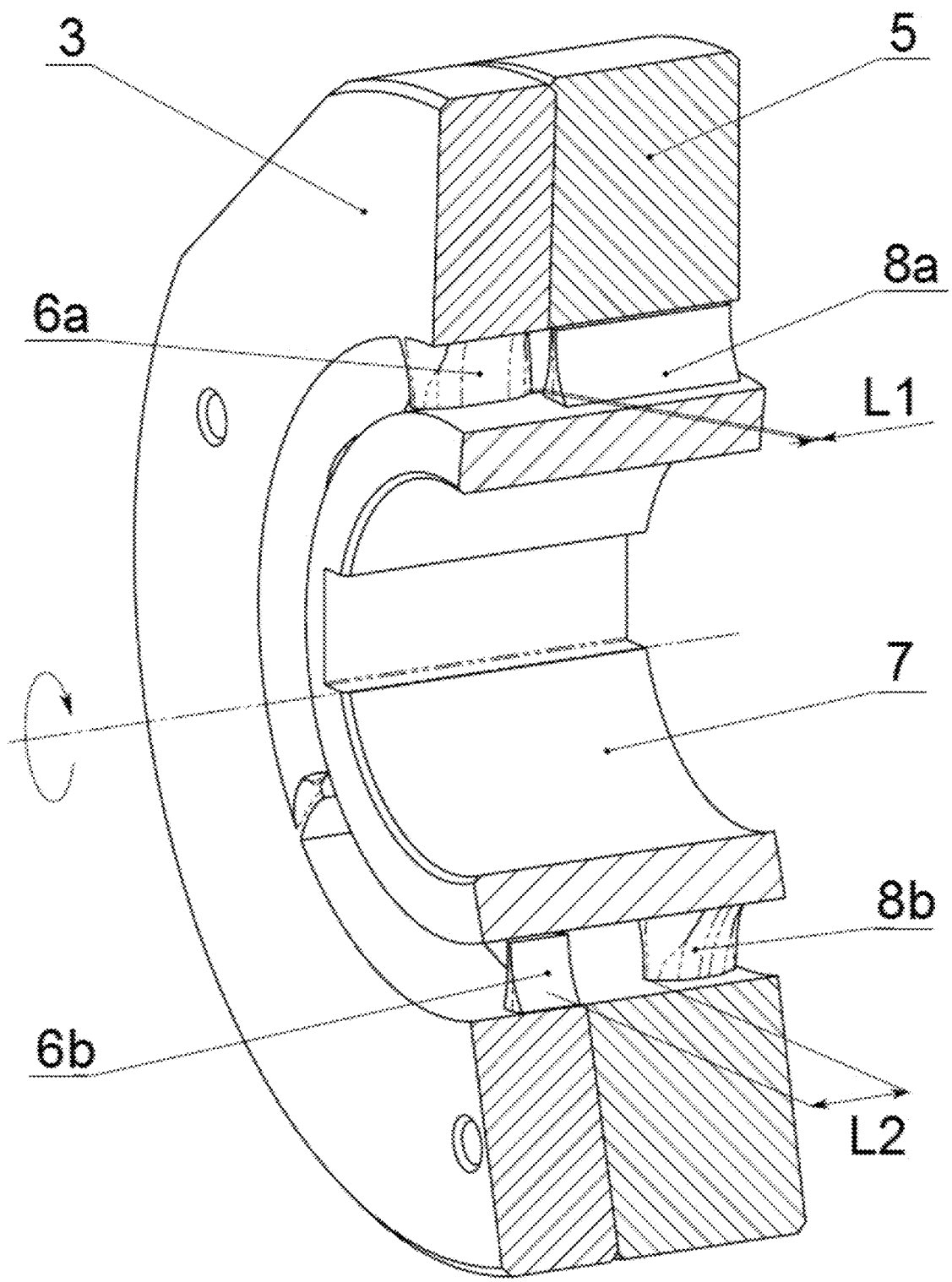

FIG. 2—the deformation portion—place A on FIG. 1 for the first variant of the device.

Figure 3:
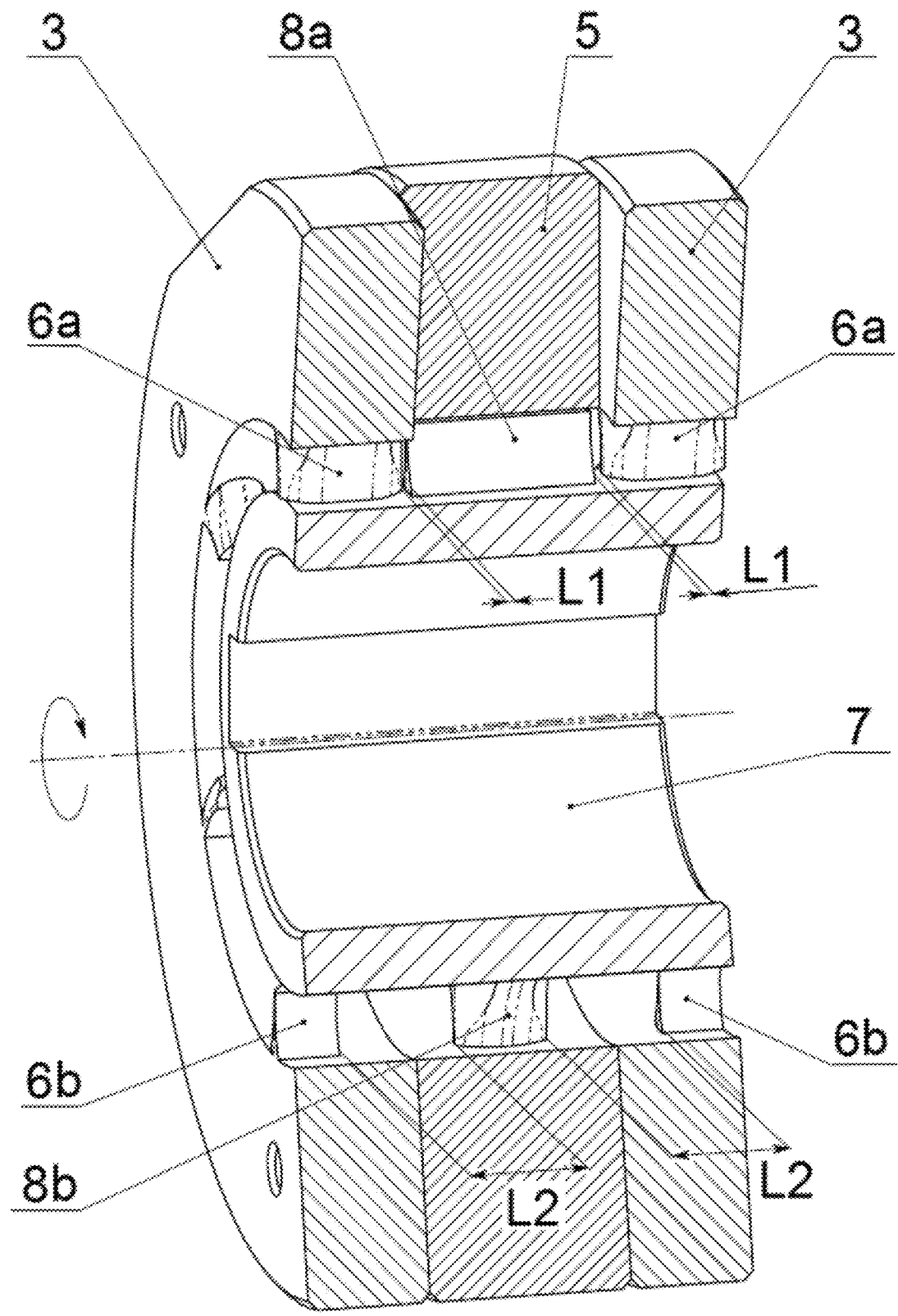

FIG. 3—the deformation portion—place A on FIG. 1 for the second variant of the device.

Figure 4:
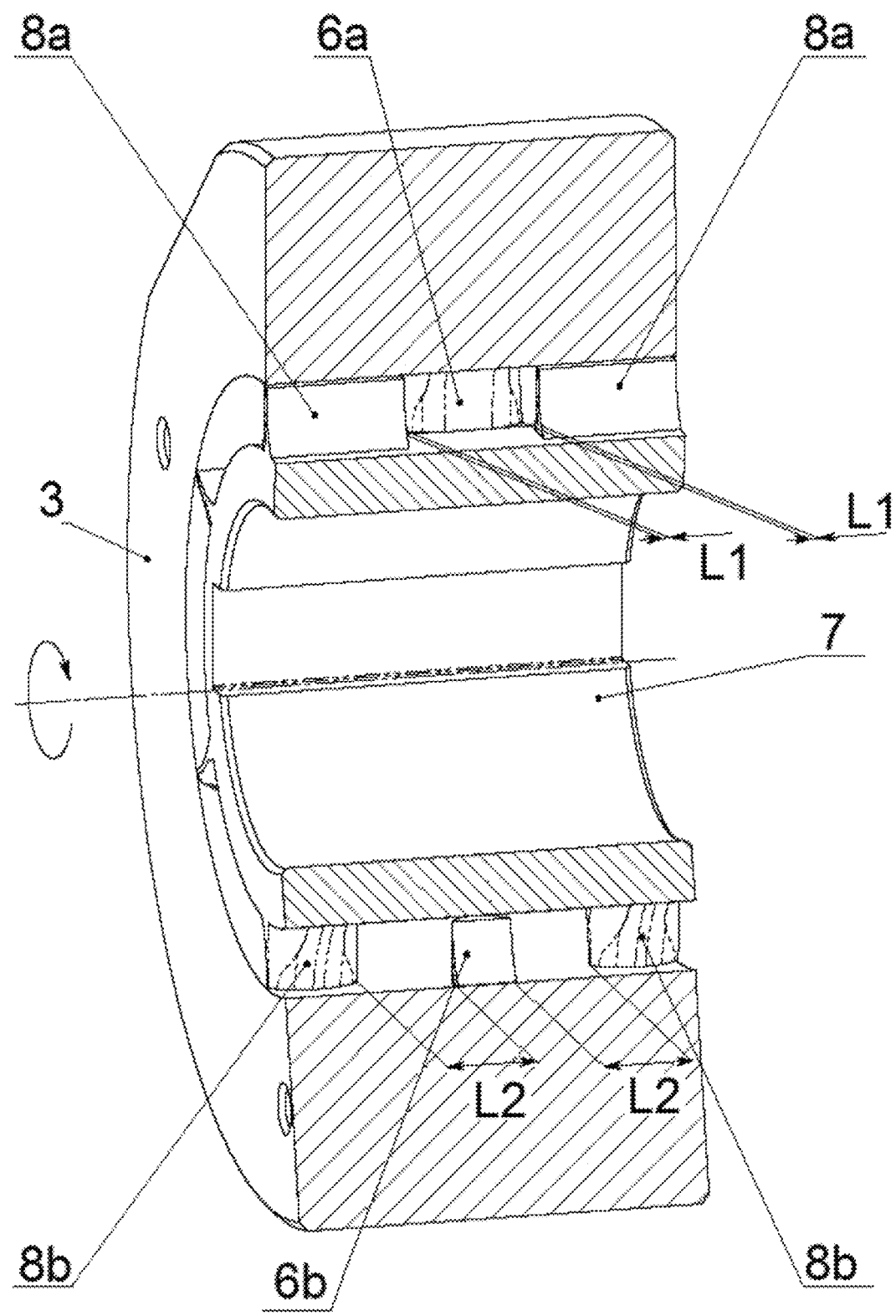

FIG. 4—the deformation portion—place A on FIG. 1 for the third variant of the device.

Figure 5:
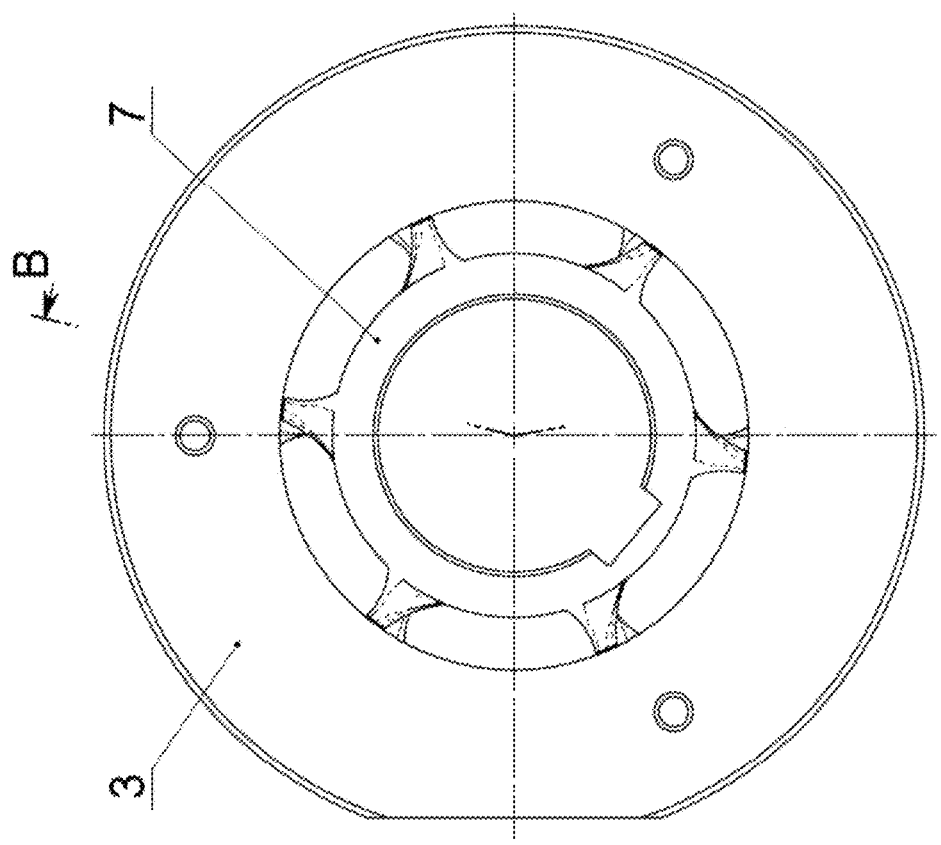

FIG. 5—the deformation portion for the third variant, side view.

Figure 6:
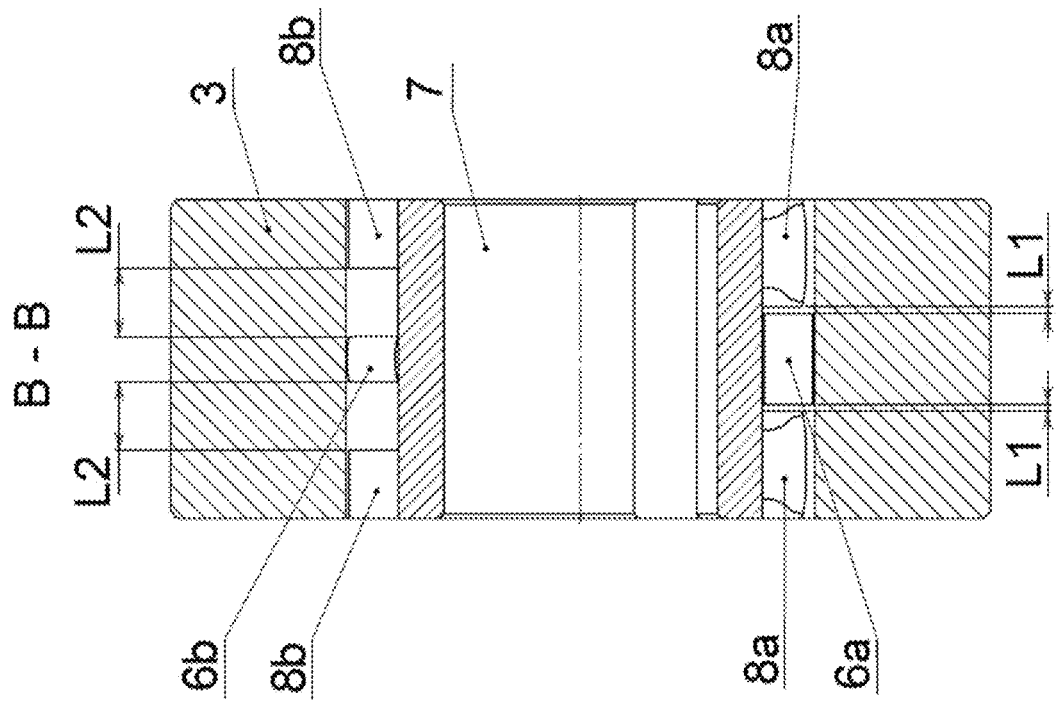

FIG. 6—section B-B on FIG. 5.

Figure 7:
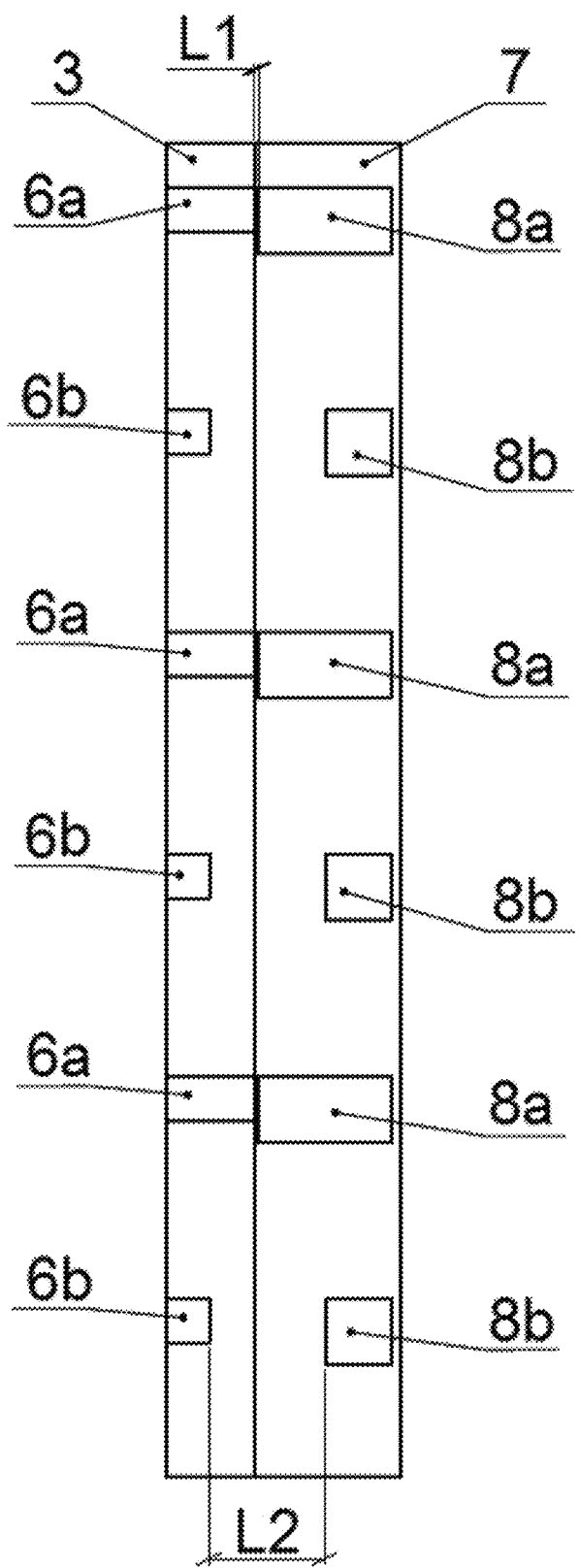

FIG. 7—scheme of placement of the protrusions in the device according to the first variant.

Figure 8:
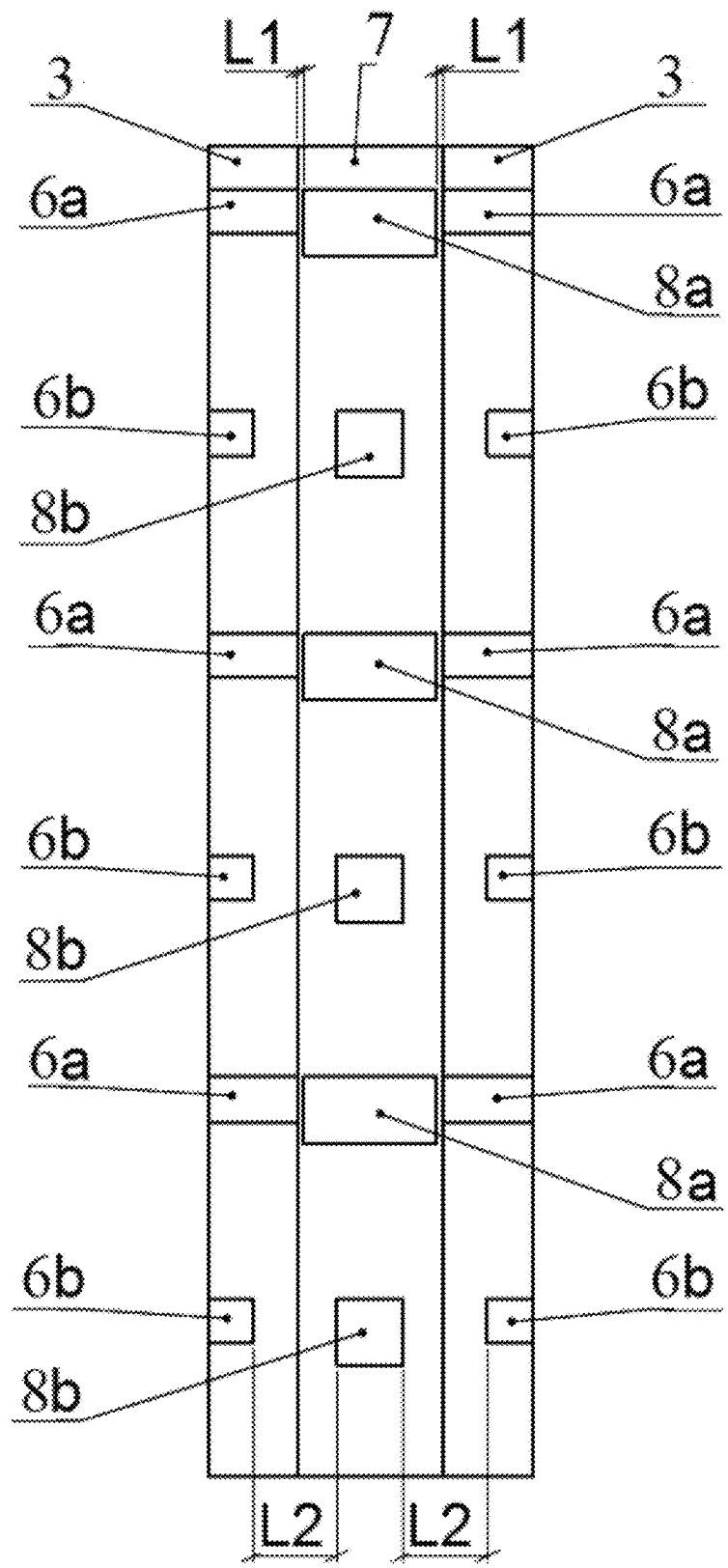

FIG. 8—symmetrical scheme of placement of the protrusions in the device according to the second variant.

Figure 9:
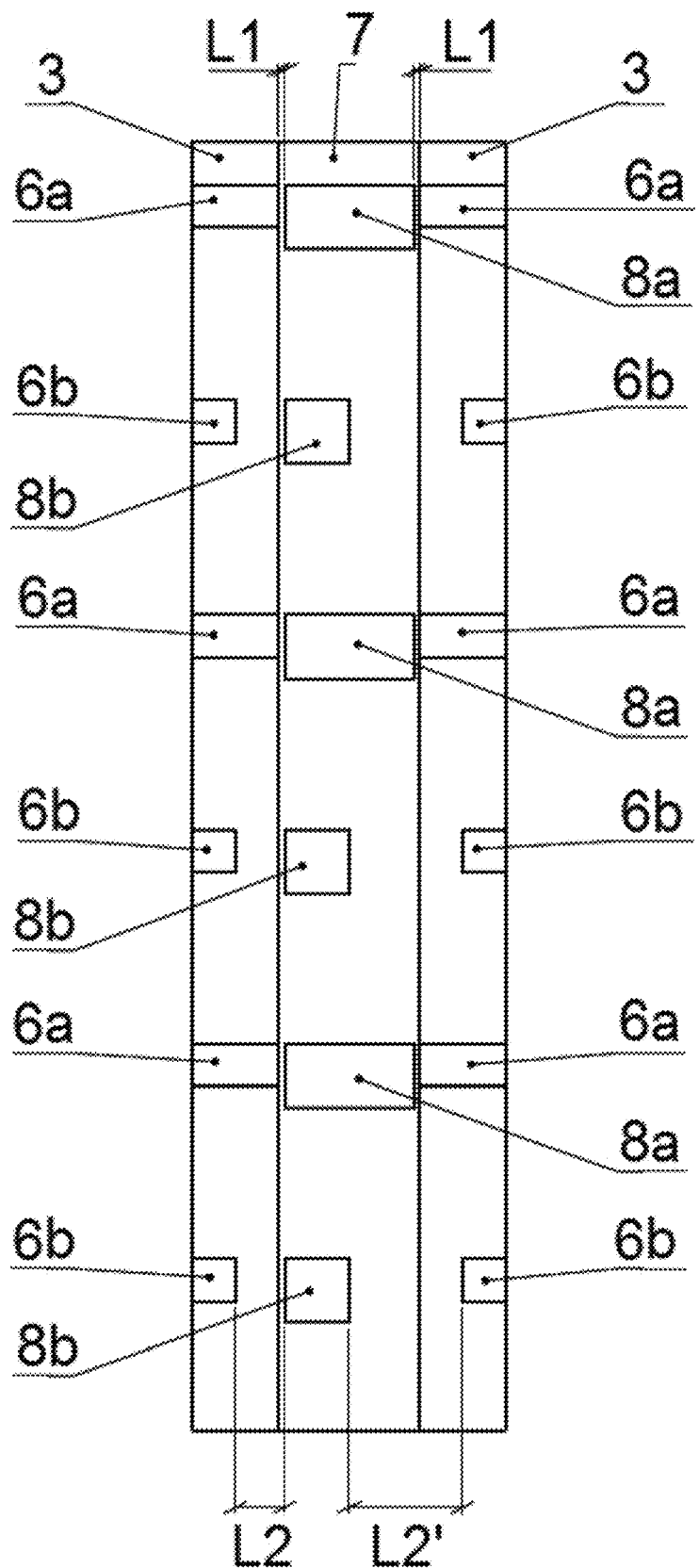

FIG. 9—asymmetrical scheme of placement of the protrusions in the device according to the second variant.

Figure 10:
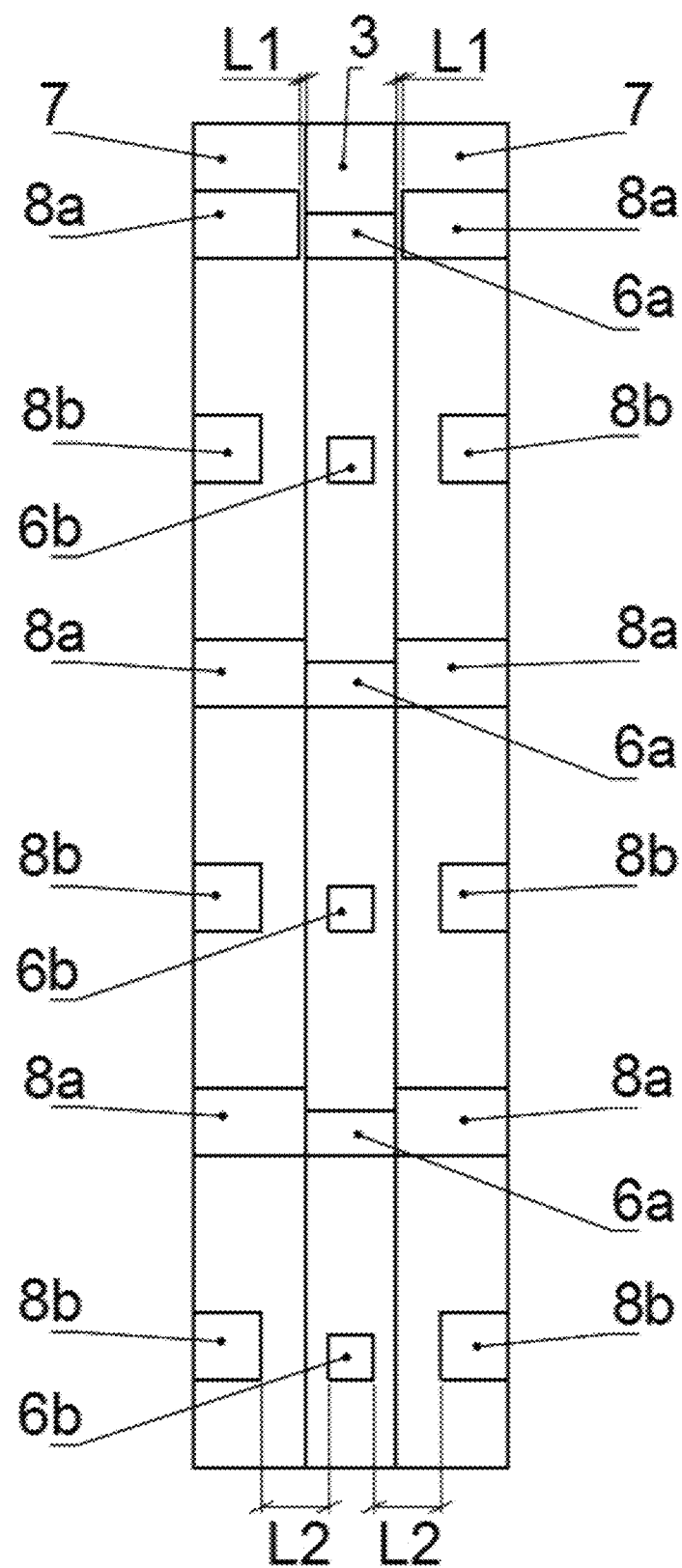

FIG. 10—symmetrical scheme of placement of the protrusions in the device according to the third variant.

Figure 11:
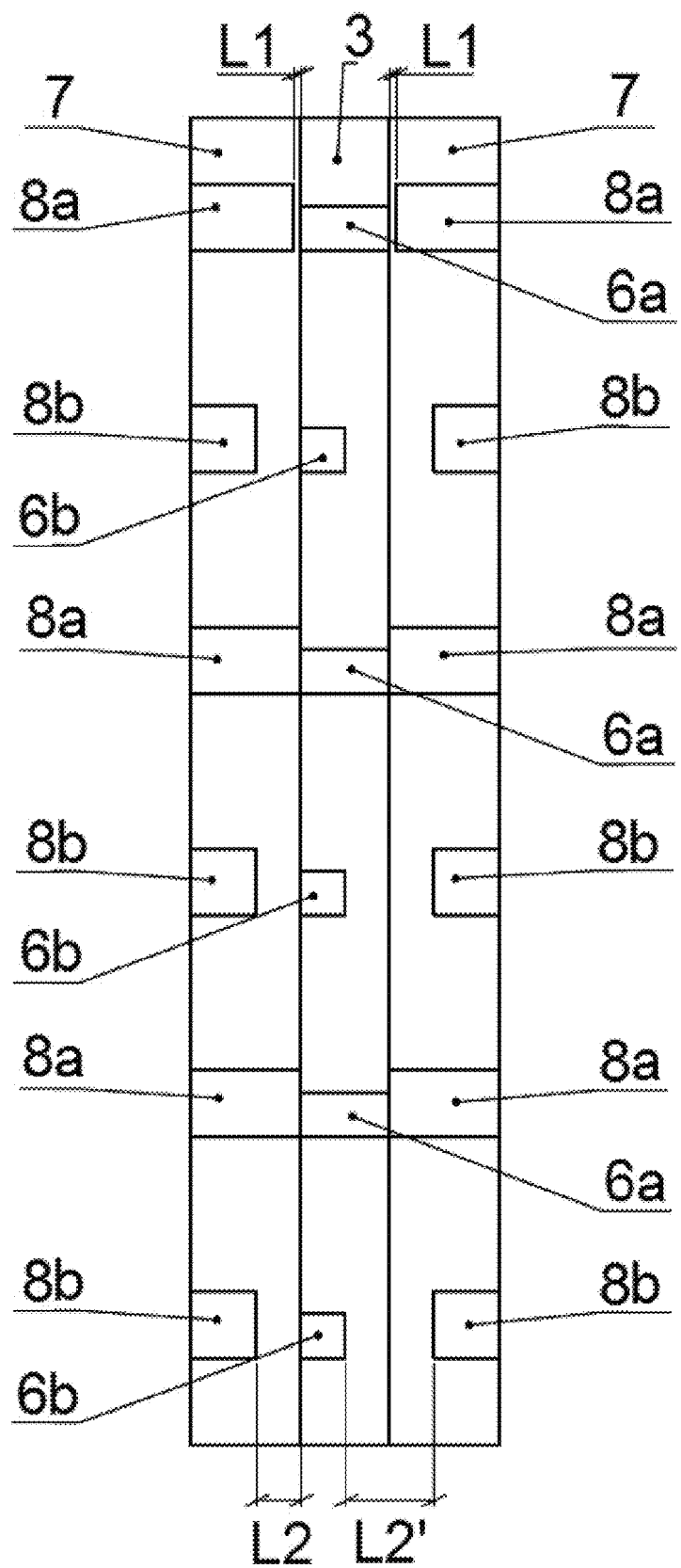

FIG. 11—asymmetrical scheme of placement of the protrusions in the device according to the third variant.

Figure 12:
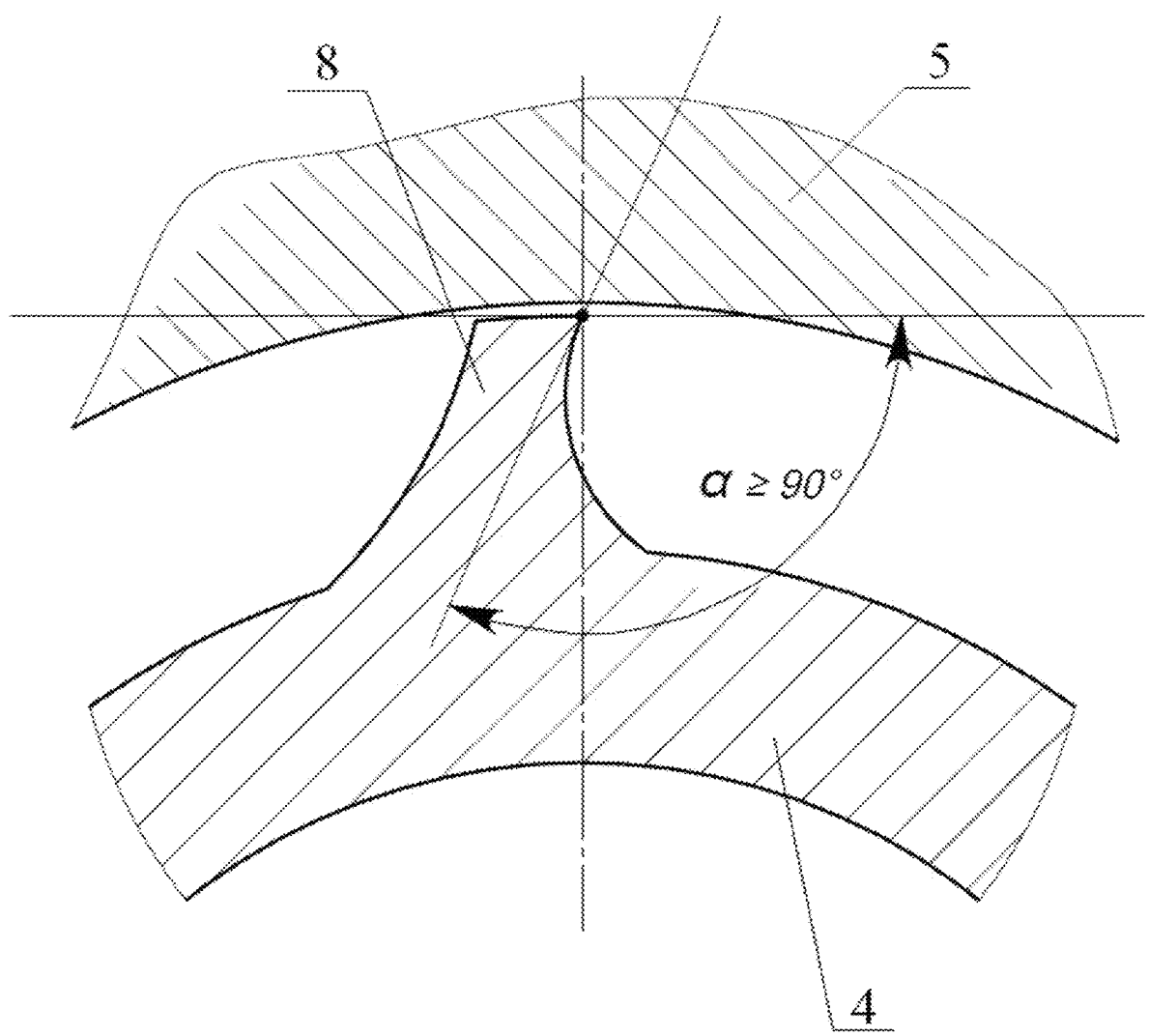

FIG. 12—a profile of protrusions of a rotor for all variant of the device.

Figure 13:
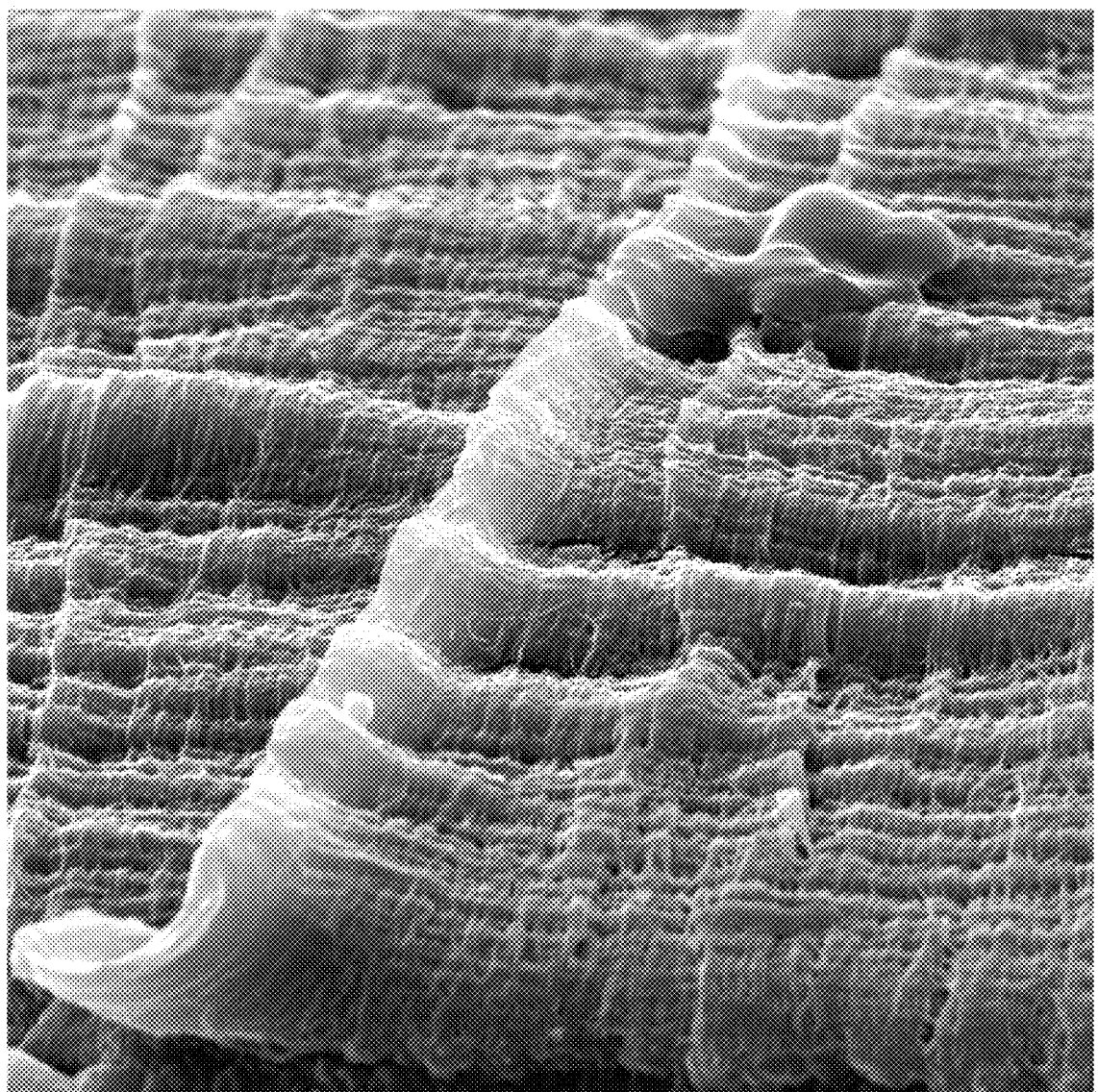

FIG. 13—structure of the ultra-high-molecular-weight polyethylene (UHMWP) in the blanks extended by standard complete screw extruders without deformation portions.

Figure 14:

FIG. 14—the same for the blanks extended by the proposed device according to the second variant.

Figure 15:
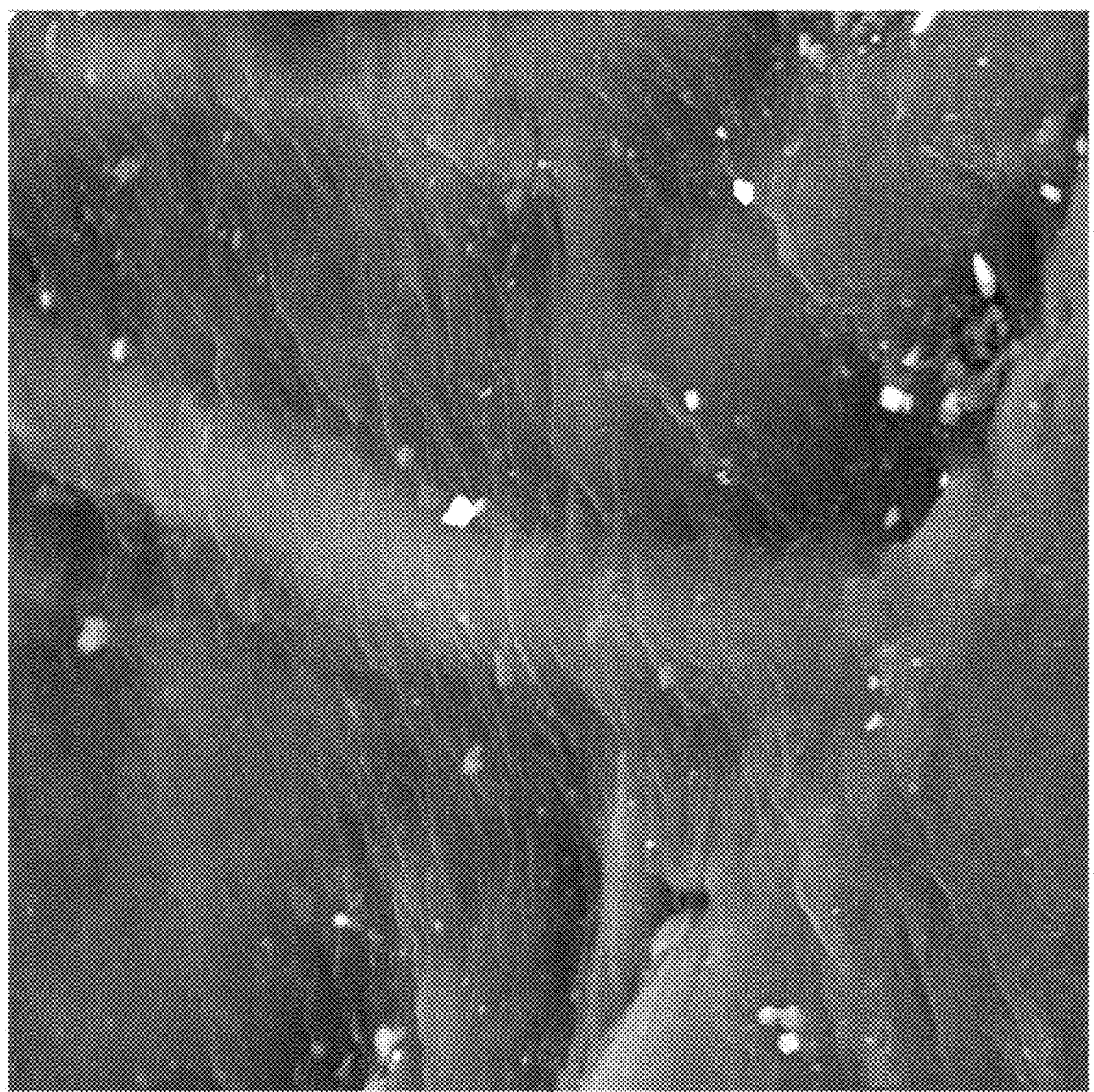

FIG. 15—fracture of a blank made of a composite of UHMWP and carbon black, extended by the proposed device, magnification $5.10^3$.

Figure 16:
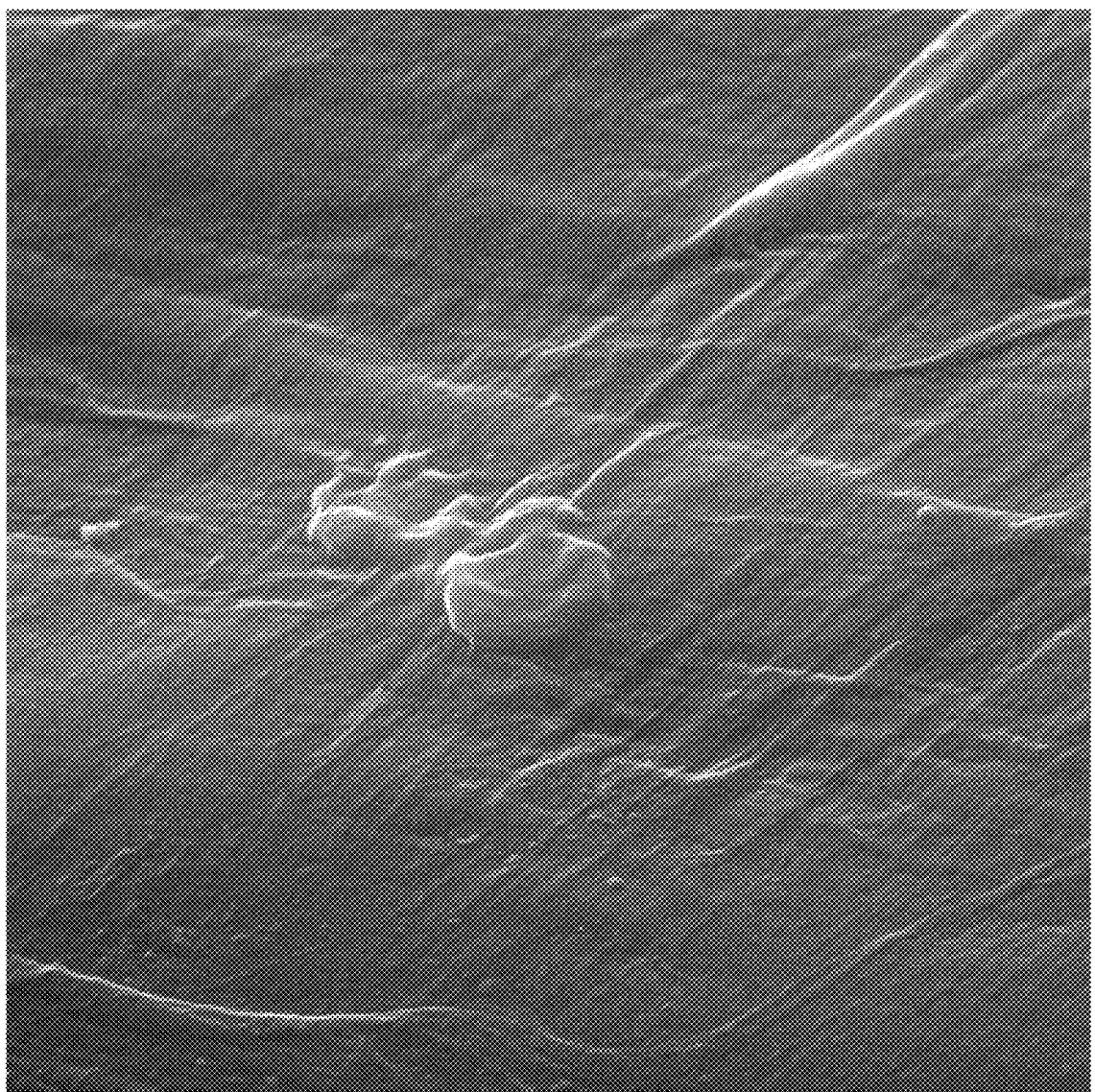

FIG. 16—the same, magnification $10^4$.

Figure 17:
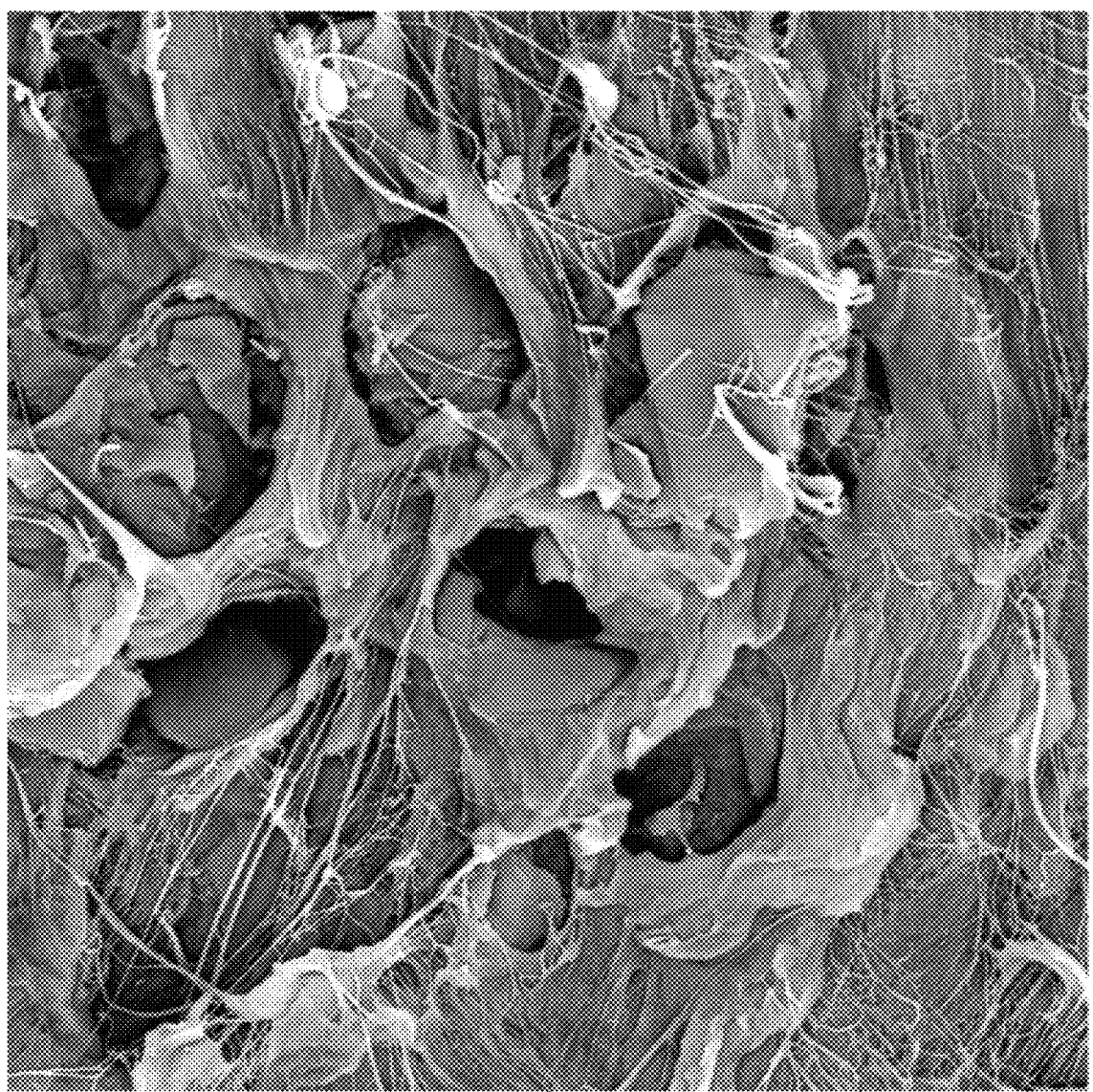

FIG. 17—fracture of a blank made of a composite of UHMWP and flaked graphite, magnification $5.10^3$.

Figure 18:
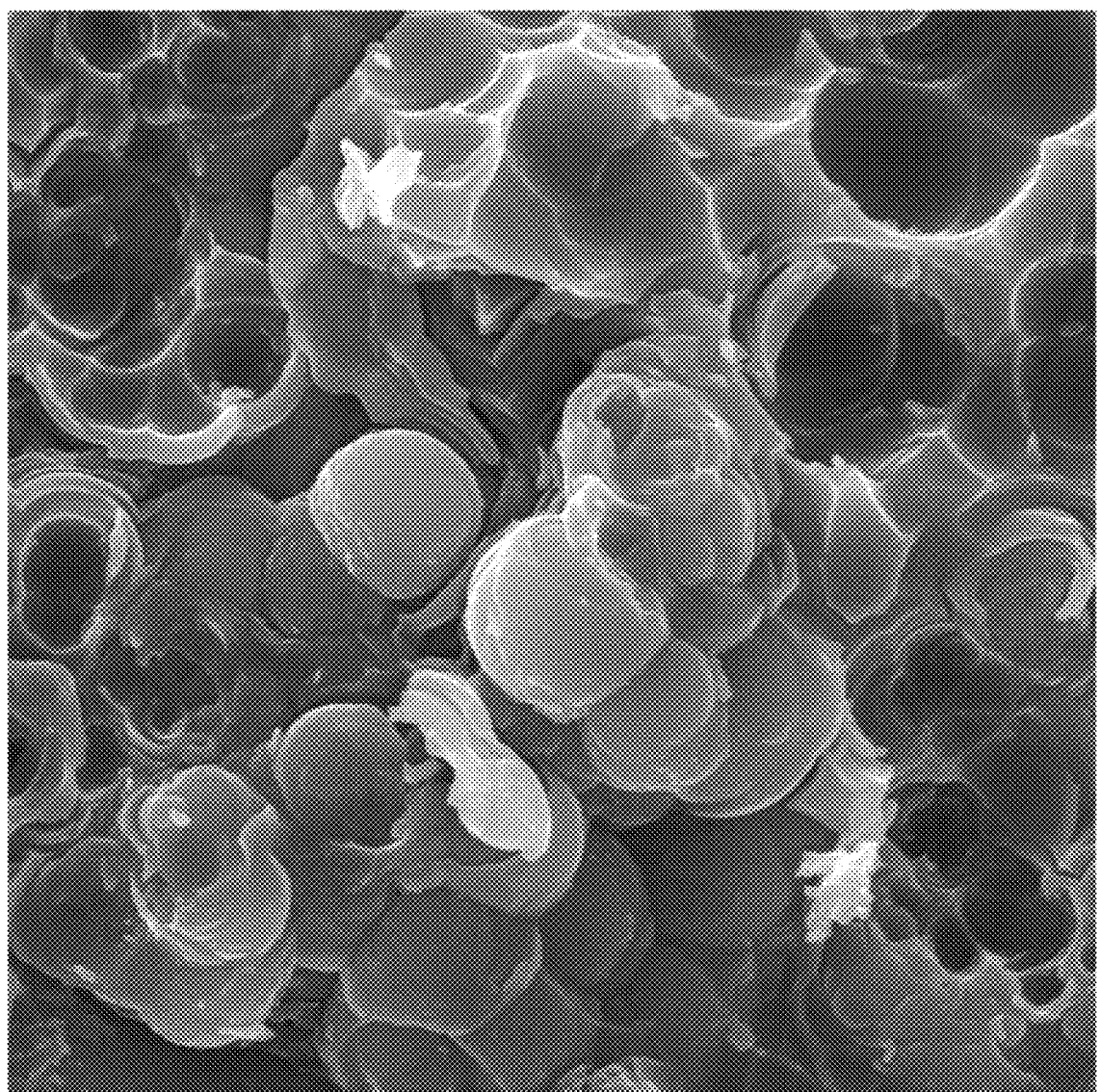

FIG. 18—fracture of a blank made of coke and pitch.

EXAMPLES OF EMBODIMENTS OF THE PRESENT INVENTION

The device for manufacturing blanks or products of a composite, polymer or plasticized powdered material comprises a screw extruder (FIG. 1) with a housing 1 and a screw 2 inside the housing 1. Both the housing 1 and the screw 2 have at least one deformation portion with protrusions (site A in FIG. 1). Both the housing and the screw 2 can be made either in one piece with the protrusions or can be made combined, having particular inserted rings provided with protrusions. Particular cases of execution for all the three variants of the device are described below where the housing 1 and the screw 2 are made combined and comprise, on the deformation portions, stator rings attached to adjacent parts of the housing, and rotors attached to adjacent parts of the screw 2.

According to the device of the first variant (FIG. 2), each deformation portion of the housing 1 comprises a stator 3 fastened in a recess of the housing or between the parts of the housing, and a rotor 4 attached between turns 9 of the screw 2 on a shaft 10 of the screw. As shown in FIG. 2, the stator 3 is built as a ring the diameter of the inner cylindrical surface of which is equal to the inner diameter of the other parts of the housing 1. In the same recess, coaxially to the stator 3, a ring 5 is mounted the diameter of the inner surface of which is equal to the inner diameter of the stator 3. The stator 3 and the ring 5 can be made as well as one piece (not shown in the figures). A portion of the other part of the housing 1 can serve as said ring 5 (not shown in the figures).

The outer surface of the rotor 4, inside the ring 5, comprises protrusions 8 having a different width, for example, the protrusions 8a have a width equal to the width of the ring 5, whereas the protrusions 8b have a width that is lower than that of the ring 5. In a preferred embodiment, the working surface of the protrusions 8 has a bent in portion, while in the section orthogonal to the axis of the screw 2, the tangent line to the working surface of each protrusion 8 forms, at the final point thereof closest to the stator 3, an obtuse angle α with the tangent line to the inner surface of the ring 5 of the stator 3 (see FIG. 12). Such a shape of the protrusions 8 favors cleaning of the ring 5 surface relatively to which the protrusions 8 slip. A space between the protrusions of the rotor 4 and the cylindrical surface of the ring 5 is assigned in accordance with one of the running fits for a considered nominal size.

The inner surface of the stator 3 comprises protrusions having a different width (a dimension along the extruder axis), for example, the width of the protrusion 6a is equal to the width of the stator 3, while the width of the protrusion 6b is less than that of the stator 3. In a preferred embodiment, the working surface of the protrusions 6 has a bent in portion, while in the section orthogonal to the axis of the screw 2, the tangent line to the working surface of each protrusion 6 forms in this plane, at the final point thereof closest to the rotor 4, an obtuse angle with the tangent line to the outer surface of the hub 7 of the rotor 4 (similarly to the diagram for the protrusions 8 of the rotor 4 in FIG. 12). Such a shape of the protrusions 6 favors cleaning of the hub 7 surface which slips relatively to the protrusions 6. A space between the protrusions 6 of the stator 3 and the cylindrical surface of the hub 7 of the rotor 4 (FIG. 1) (either that of an additional ring mounted onto the screw shaft or that of the boundary portion of the screw itself—not shown in the figures), the nominal diameter of which is equal to the inner diameter of the screw 2 thread, is assigned in accordance with one of the running fits for a considered nominal size.

Sizes of the protrusions 6 and 8 as well as the arrangement thereof in the axial direction are selected so that when the screw 2 turns, the distances between the facing side (end) faces of the protrusions 6 and 8, respectively those of the stator 3 and of the rotor 4, facing each other that means located in planes orthogonal to the rotor 4 axis, depending on the width of the protrusions 6a or 6b of the stator 3 and of the width of the protrusions 8a or 8b of the rotor 4, be different and be alternately equal to the value of the admissible space allowable clearance, for example 0.1 mm ($L_1$) and to the distance of at least the half-height of a turn 9 of the screw 2 ($L_2$) (in FIG. 7, $L_2$ is equal to three heights of the turn 9 of the screw 2). With the increase of this distance, the degree of deformation of the material decreases. In this case, couples of protrusions 6 and 8 or groups of couples of protrusions 6 and 8 with the distance $L_1$ and couples of protrusions 6 and 8 or groups of couples of protrusions 6 and 8 with the distance $L_2$ alternate in the circumferential direction, it means that the distances between the protrusions can alternate both via every second couple of protrusions or via every several couples of protrusions. A group of couples of protrusions with the same distance can have two or more couples of protrusions, so that the distance between the protrusions changes, as a minimum, once in the circumferential direction.

A variant is possible as well when the distances between the protrusions do not alternate but remain constant at each side of the protrusions of the screw (rotor 4), in particular, couples of protrusions 6 of the housing (stator 3) in one row and couples of protrusions 8 of the screw (rotor 4) have the distance $L_1$ whereas couples of protrusions 6 of the housing (stator 3) of another row and the protrusions of the screw (rotor 4) have the distance $L_2$ (not shown in the figures).

Other variants of location of couples of protrusions with the distance $L_1$ and the distance $L_2$ are possible as well. For example, at one side of the rotor 4 there are couples of protrusions only with the distance $L_1$ and at the other side they are only with the distance $L_2$, or at one side there is a permanent distance $L_1$ or $L_2$, whereas at the other side the distances alternate, and so on.

The device according to the second variant is characterized, as shown in FIG. 3, by the fact that at each deformation portion, the screw 2 is provided with a rotor 4 (FIG. 1) mounted on the shaft 10 of the screw 2 and fastened between the turns 9 of the screw 2, and with two stators 3 located on both sides thereof that make part of the extruder housing 1 and that are separated by a smooth ring 5 the width of which is equal to the maximum width of the protrusions of the screw 2. Two stators 3 and the ring 5 can be made as a single piece such as a single stator (not shown in the figures). The inner nominal diameter of the ring 5 is equal to the inner diameter of the other parts of the housing 1. Each stator 3 is made as a ring the diameter of the internal surface of which is equal to the internal diameter of the other parts of the housing 1. This surface comprises the protrusions 6 having a different width (the dimension along the extruder axis), for example, the width of the protrusion 6a is equal to the width of the stator 3, while the width of the protrusion 6b is less than the width of the stator 3. The working surface of the protrusions 6 is bent in, whereas in the section orthogonal to the axis of the screw 2, the tangent line to the working surface of each protrusion 6 at the final point thereof closest to the stator 3 forms an obtuse angle with the tangent line to the outer surface of the hub 7 of the rotor 4 (similarly to the diagram for the protrusions 8 of the rotor 4 in FIG. 12). Such a shape of the protrusions 6 favors cleaning of the hub 7 surface on which the protrusions 6 slip.

The hub of the rotor 4 (FIG. 1) is made as a ring the diameter of the inner surface of which is equal to the diameter of the shaft 10 of the screw 2, while the diameter of the outer surface is equal to the inner diameter of the thread of the screw 2. The outer surface of the hub 7 of the rotor 4 comprises protrusions 8 having a different width, for example, the protrusions 8a have a width equal to that of the ring 5, while the protrusions 8b have a width inferior to that of the ring 5. The space between these protrusions 8 and the inner surface of the ring 5 that separates the stators (or the surface of the housing between the stators or the stator surface between the rows of protrusions) is assigned according to one of the running fits for the nominal diameter of the internal surface of the ring 5. The shape of the working surface of the protrusions 8 is similar to the shape thereof according to the first variant.

The sizes of the protrusions 6 and 8 as well as the arrangement thereof in the axial direction are so selected that when the screw 2 turns, the distances between the facing end faces of the protrusions 6 and 8, respectively those of the stator 3 and of the rotor 4, facing each other in a technological sequence, that is located in planes orthogonal to the rotor 4 axis, depending on the width of the protrusions 6a or 6b of the stator 3 and of the width of the protrusions 8a or 8b of the rotor 4, be alternately equal to the minimum allowable clearance ($L_1$), for example 0.1 mm and to the distance ($L_2$) of at least the half-height of a turn 9 of the screw 2. With the increase of this distance, the degree of deformation of the material decreases. In this case, couples of protrusions or groups of couples of protrusions with the distance $L_1$ and couples of protrusions or groups of couples of protrusions with the distance $L_2$ alternate in the circumferential direction.

In this case, the protrusions 8b of the rotor 4 (FIG. 1) having a low width can be mounted symmetrically relative to the stators 3 (FIG. 8). The protrusions 8b can be shifted as well towards one of the stator rings (FIG. 9) so that the distances between end face surfaces of the wide protrusions 6a of the first left stator 3 and the narrow protrusions 8b, shifted to the same, of the rotor 4, when the protrusions face each other in the absence of narrow protrusions 6b, can be the same and equal to the minimum allowable clearance or, in the presence of both protrusions 6a and 6b on the left stator can alternate at least once per turn, and be equal alternately to the minimum allowable clearance ($L_1$), for example 0.1 mm and to the distance ($L_2$) of at least the half-height of a turn 9 of the screw 2 (in FIG. 9, it is equal to three half-heights of the turn 9 of the screw). With such a diagram of arrangement of the rotor 4 protrusions 8b having a low width, the distances between the facing end faces of these protrusions 8b of the rotor 4 and of the second right stator 3 can be, when the right stator 3 contains only the 6a protrusions, similar and equal, for example, to three or to four and a half heights of the turn 9 of the screw 2, when the second stator 3 contains both 6a and 6b protrusions at least once per turn, can alternate and be equal to the distance ($L_2^1$), equal alternately, for example, to three or more and to four and a half or more heights of the turn 9 of the screw 2 (FIG. 9). With the increase of this distance, the degree of torsional deformation of the material decreases.

The device according to the third variant is characterized, as shown in FIGS. 4-6, by the fact that on both sides of the protrusions 6a and 6b, on the inner surface of the stator 3 attached in a recess or between two adjacent parts of the housing 1 of the extruder there are located two rows of protrusions 8a and 8b placed on the outer surface of the hub 7 of the rotor 4, or one row on the outer surfaces of the hubs of the rotors separated by a bushing (not shown in the figure) having the outer diameter equal to the inner diameter of the thread of the screw 2. The bosses 6 and 8 of the stator 3 and of the rotor 4 (or of two rotors) are mounted so that the space between them and the cylindrical surfaces lying opposite to the same, respectively on the stator 4 and the rotor 3, is assigned according to one of the running fits for nominal diameters of these opposite surfaces. Like in the device of the second variant, the protrusions 6b of the stator 3 having a small width can be mounted symmetrically relative to two rows of protrusions 8 of the rotor 4 (two rotors ((FIG. 10), or can be shifted towards one of the rows of protrusions 8 of the rotor 4 (to one of the two rotors (FIG. 11) to form, like in the device of the second variant, various similar combinations of distances between end faces of the narrow protrusions 6b of the stator 3 and those of each row of protrusions 8 of the rotor 4 (two rotors) facing each other. The shape of the working surface of the protrusions 8 is similar to the shape thereof in the device of the first variant.

The claimed devices according to the present invention operate as follows.

Powdered charge poured into the channel of the screw extruder (FIG. 1) is submitted to a previous compression and is pushed into the deformation portion A the diagram of which is given in FIG. 2. Between two variants of technological sequence stator-rotor or rotor-stator, it is preferred the configuration of the deformation portion where the first variant is chosen since it provides for blocking a material cranking at the entry into the deformation unit and increases the pressure of pushing the material by the turns 9 of the screw 2. At any of the selected technological sequences, the material is retained with respect to the stator 3 and the rotor 4 by means of the protrusions 6 and 8 provided on the surfaces thereof. When the rotor 4 turns, the annular section of the material retained against the rotor 4 is shifted with respect to the annular section of the material fastened in the stator 3, and, depending on the distance between the end faces of the protrusions 6 and 8 on the movable and fixed elements of the deforming unit, the material undergoes a simultaneous combined action of torsional strain relatively to the extruder axis and that of simple shearing strain operating in the planes orthogonal to the extruder axis, with a cyclic modification of the values of each other. In this case, the signs of these increments are opposite, and at every cycle of such a modification of the torsional strain and simple shearing strain values, the directions of relative shifting of the material particles modify the angle from 20° to 35° for a number of such modifications equal to at least one per screw 2 turn, whereas for the period of time when the material travels through one annular deformation zone, the number of such modifications increases up to 5 times and even more.

The wide protrusions 6a and 8a and the narrow protrusions 6b and 8b on the surfaces of the stator 3 and the rotor 4, as a variant, can be arranged in groups alternating one after another, and in this case, (a) when the rotor 4 turns in the portions of annular sections of the stator 3 and the rotor 4 that are provided with groups of narrow protrusions 6b and 8b, the material, during the relative displacement of the same, is submitted to the torsional deformation relatively to the extruder axis (the distance between the end faces is L2), and (b) in the parts of the annular sections of the stator 4 and the rotor 3 that are equipped with wide protrusions 6a and 8a, the material, at the relative displacement of the same, is submitted to the simple shearing deformation (the distance between the end faces is L1) applied in the planes orthogonal to the extruder axis; (c) in the case of an opposite arrangement of the sectors of the stator 3 and of the rotor 4 provided at one side with wide protrusions 6a (8a) and, at the other side, with narrow protrusions 8b (6b), while these zones undergo a relative shift, the material is submitted to a combined effect of the torsional deformation relatively to the extruder axis and of the simple shearing deformation applied in the planes orthogonal to the extruder axis, with a constant value for both deformations. At each passage from the torsional deformation or from the shearing deformation to a combined action of these deformations, the directions of relative shifting of the material particles are modified at an angle from 20° to 35° for a number of such modifications equal to at least two per screw turn.

Since in structurally heterogeneous media which comprise composite and powdered materials as well, the zone, in which, in the case of the shearing deformation, an intensive shifting of structural elements composing said material occurs, is as high as 30-50% of the thickness of the layer to be deformed, according to experiments, in order to enable the torsional deformation in the material, the distances between the protrusions providing material annular sections shifting one relatively to another in the screw channel should be equal to at least a half of the shearing band, that is not less than a half-thickness of the deformed layer of material, which is equal to the height of the protrusions on the stator and on the rotor, that is to the height of a screw turn.

If the material, as shown in FIG. 1, is extruded through two or more series deforming units illustrated in FIGS. 3 and 4, the material in each deformation zone can undergo whether the torsional deformation or the simple shearing deformation, in each cycle of such a transition from torsional deformation to the shearing deformation, the directions of relative shifting of the material particles are modified at an angle from 20° to 45°.

If the material is extruded through two or more deformation zones illustrated in FIG. 2, the directions and signs of all the deformations that the material undergoes in each of said deformation zones of said units are equal.

If the material is extruded through the deformation zones illustrated in FIGS. 3 and 4, in each of the successive deformation zones the directions of the torsional and shearing deformations of the material are modified to the opposite compared to the previous ones.

The structure of the ultra-high-molecular-weight polyethylene (UHMWP) in the blanks extended by standard complete screw extruders is illustrated in FIG. 13 (fracture, magnification $5.10^3$). The variety of structures of UHMWP that was submitted to processing in the device of the present invention according to the second variant (FIG. 1) is shown in FIG. 14 (fracture, magnification $3.10^3$). The high degrees of the shearing and torsional deformations that undergoes the material and the modifications of the directions of relative shifting of the material particles during the extrusion of the same through the annular deformation zones provide for homogenous structure of composite materials and a good quality of combining various structural elements into a single material the initial charge of which con be composed of a mechanical mixture of powders of different composition and of different dispersity.

Homogeneity of the structures obtained with the devices of the present invention is shown as well on other photos. In particular, FIG. 15 (fracture, magnification $5.10^3$) and FIG. 16 (fracture, magnification $10^4$) demonstrate the distribution of carbon black particles having a size of 0.1 to 2-3 μm, in UHMWP having the size of particle of ~50 μm in a blank obtained with the device according to the first variant.

FIG. 17 (fracture, magnification $5.10^3$) shows the structure of a composite material containing UHMWP and flaked graphite with the size of particles of ~10 μm, in a blank obtained with the device according to the third variant.

FIG. 18 shows a fracture of the material from a blank containing powdered coke with the size of particles of less than 10 μm and powdered pitch with the size of particles up to 1 mm, obtained with the device according to the second variant.

The invention claimed is:

1. A device for deformational processing of materials comprising a screw extruder having
    a housing with a cylindrical inner surface and
    a screw
    each one of the last presenting at least one deformation portion located between the screw turns,
    the extruder housing having, on the inner surface of at least one deformation portion, several protrusions arranged in a row on a circumference and with a space between the same and the outer cylindrical surface of the screw body between the turns of the last,
    the screw having, on the outer surface of at least one deformation portion, several protrusions arranged in a row on a circumference and with a space between the same and the inner surface of the housing,
    sizes of said protrusions in the axial direction and location thereof being selected so that when the protrusions of the housing and the protrusions of the screw are facing each other, they form couples of protrusions having, between plain facing surfaces of the protrusions of the housing and of the protrusions of the screw, a distance equal to a minimum allowable clearance $L_1$ for some couples of protrusions, the other couples of protrusions having the distance $L_2$ that is not less than the half-height of the screw turn,
    the couples of protrusions or groups of couples of protrusions with the distance $L_1$ and the couples of protrusions or groups of couples of protrusions with the distance $L_2$ alternating in the circumferential direction.

2. The device of claim 1, wherein the screw is made combined in such a way that a part thereof at each deformation portion is made as at least one ring rigidly attached to an adjacent part of the screw.

3. The device of claim 1, wherein the housing is made combined in such a way that a part thereof at each deformation portion is made as at least one ring rigidly attached to an adjacent part of the housing.

4. A device for deformational processing of materials comprising a screw extruder having
    a housing with a cylindrical inner surface and
    a screw
    each one of both of them presenting at least one deformation portion arranged between the screw turns,
    the extruder housing having, on the inner surface of at least one deformation portion, several protrusions arranged in two rows on a circumference and with a space between the same and the outer cylindrical surface of the screw body between the turns of the last,
    the screw having, on the outer surface of at least one deformation portion, several protrusions arranged in a row on a circumference between the rows of protrusions of the housing and with a space between the screw protrusions and the inner surface of the housing,
    sizes of said protrusions in the axial direction and the arrangement thereof being selected so that when the protrusions of the housing and the protrusions of the screw are facing each other, they form couples of protrusions having, between plain facing surfaces of the protrusions of the housing and of the protrusions of the screw, a distance equal to a minimum allowable clearance $L_1$ for some couples of protrusions, the other couples of protrusions having the distance $L_2$ that is not less than the half-height of a screw turn.

5. The device of claim 4, wherein the couples of protrusions or groups of couples of protrusions with the distance $L_1$ and the couples of protrusions or groups of couples of protrusions with the distance $L_2$ alternate in the circumferential direction.

6. The device of claim 5, wherein sizes of the protrusions in the axial direction and the arrangement thereof are so selected that when the housing protrusions of both rows and the screw protrusions are facing each other, they form couples of protrusions having, between said facing surfaces, a distance equal to a minimum allowable clearance $L_1$ for some couples of protrusions, the other couples of protrusions having this distance equal to the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction.

7. The device of claim 5, wherein the sizes of the protrusions in the axial direction and the arrangement thereof are so selected that when the housing protrusions of one row and the screw protrusions are facing each other, they form couples of protrusions having, between said facing surfaces, a distance equal to a minimum allowable clearance $L_1$ for some couples of protrusions, the other couples of protrusions having the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction, and when the protrusions of the second row of the housing and the screw protrusions are facing each other, they form couples of protrusions with a distance between the facing surfaces equal to the minimum allowable clearance $L_1$ for all the couples of protrusions.

8. The device of claim 4, wherein the couples of protrusions of the housing in a row and the screw protrusions have the distance $L_1$ and the couples of protrusions of the housing in another row and the screw protrusions have the distance $L_2$.

9. The device of claim 4, wherein the screw is made combined in such a way that a part thereof on each deformation portion is made as at least one ring rigidly attached to an adjacent part of the screw.

10. The device of claim 9, wherein the housing is made combined in such a way that a part thereof at each deformation portion is made as at least one ring rigidly attached to an adjacent part of the housing.

11. The device of claim 4, wherein the housing is made combined in such a way that a part thereof at each deformation portion is made as at least one ring rigidly attached to an adjacent part of the housing.

12. A device for deformational processing of materials comprising a screw extruder having
a housing with a cylindrical inner surface and
a screw
each one of both of them presenting at least one deformation portion located between the screw turns,
the screw having, on the outer surface of at least one deformation portion, several protrusions arranged in two rows on a circumference and with a space between the screw protrusions and the inner surface of the housing,
the extruder housing having, on the inner surface of at least one deformation portion, several protrusions arranged in a row on a circumference between the rows of screw protrusions and with a space between the housing protrusions and the outer cylindrical surface of the screw body between the turns of the same,
sizes of said protrusions in the axial direction and the arrangement thereof being selected so that when the protrusions of the housing and the protrusions of the screw of at least one row are facing each other, they form couples of protrusions having, between plain facing surfaces of the protrusions of the housing and of the protrusions of the screw, a distance equal to a minimum allowable clearance $L_1$ for some couples of protrusions, the other couples of protrusions having the distance $L_2$ that is not less than the half-height of a screw turn.

13. The device of claim 12, wherein the couples of protrusions or groups of couples of protrusions with the distance $L_1$ and the couples of protrusions or groups of couples of protrusions with the distance $L_2$ alternate in the circumferential direction.

14. The device of claim 13, wherein the sizes of protrusions in the axial direction and the arrangement thereof are selected so that when the housing protrusions and the screw protrusions of both rows are facing each other, they form couples of protrusions having, between said facing surfaces, a distance equal to a minimum allowable clearance $L_1$ for some couples of protrusions, the other couples of protrusions having the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction.

15. The device of claim 13, wherein the sizes of protrusions in the axial direction and the arrangement thereof are selected so that when the housing protrusions and the screw protrusions of one row are facing each other, they form couples of protrusions having, between said facing surfaces, a distance equal to a minimum allowable clearance $L_1$ for some couples of protrusions, the other couples of protrusions having this distance equal to the distance $L_2$ that is not less than the half-height of the screw turn, the couples of protrusions or groups of couples of protrusions with the distance $L_1$ and the couples of protrusions or groups of couples of protrusions with the distance $L_2$ alternating in the circumferential direction, and when the housing protrusions and the screw protrusions of the second row are facing each other, they form couples of protrusions having, between said facing surfaces, a distance equal to the minimum allowable clearance $L_1$ for all the couples of protrusions.

16. The device of claim 12, wherein the couples of screw protrusions of one row and the housing protrusions have the distance $L_1$ and the couples of screw protrusions of the other row and the housing protrusions have the distance $L_2$.

17. The device of claim 12, wherein the screw is made combined in such a way that a part thereof at each deformation portion is made as at least one ring rigidly attached to an adjacent part of the screw.

* * * * *